United States Patent [19]
Nakajima et al.

[11] 4,100,736
[45] Jul. 18, 1978

[54] SPARK-IGNITION INTERNAL COMBUSTION ENGINE EQUIPPED WITH EXHAUST GAS RECIRCULATION SYSTEM

[75] Inventors: Yasuo Nakajima, Yokosuka; Yoshimasa Hayashi; Yasuo Takagi, both of Yokohama, all of Japan

[73] Assignee: Nissan Motor Company, Limited, Yokohama, Japan

[21] Appl. No.: 687,932

[22] Filed: May 19, 1976

[30] Foreign Application Priority Data

May 22, 1975 [JP] Japan .................................. 50-61274

[51] Int. Cl.² ........................................... F02M 25/06
[52] U.S. Cl. ............................... 60/278; 123/32 MS; 123/119 A; 123/148 C; 123/193 H
[58] Field of Search ............. 123/148 C, 119 A, 30 C, 123/32 MS, 30 A, 30 E, 195 H, 193 CH, 191 M; 60/278

[56] References Cited
U.S. PATENT DOCUMENTS

| 1,754,735 | 4/1930 | Barnaby | 123/30 C |
| 1,856,328 | 5/1932 | French | 123/30 C |
| 2,191,745 | 2/1940 | Barkeij | 123/30 C |
| 3,641,986 | 2/1972 | Fricker et al. | 123/30 C |
| 3,896,777 | 7/1975 | Masaki et al. | 123/119 A |
| 3,937,015 | 2/1976 | Akado | 60/278 X |

FOREIGN PATENT DOCUMENTS

| 50,280 | 10/1939 | France | 123/148 C |
| 1,900,404 | 8/1969 | Fed. Rep. of Germany | 123/30 C |
| 427,266 | 4/1935 | United Kingdom | 123/148 C |

Primary Examiner—Irwin C. Cohen

[57] ABSTRACT

An air-fuel mixture containing a relatively large amount of recirculated exhaust gases is smoothly and rapidly burned by producing squish turbulence and igniting the mixture with a plurality of spark plugs.

7 Claims, 3 Drawing Figures

SPARK-IGNITION INTERNAL COMBUSTION ENGINE EQUIPPED WITH EXHAUST GAS RECIRCULATION SYSTEM

This invention relates to a spark-ignition internal combustion engine of a type wherein a portion of the exhaust gases are recirculated into the combustion chambers thereof.

In order to decrease the emission level of nitrogen oxides of a spark-ignition internal combustion engines, it has been proposed to recirculate a portion of exhaust gases into the combustion chambers of the engine to lower the maximum temperature and pressure of the combustion carried out in the combustion chambers, which is called exhaust gas recirculation. This exhaust gas recirculation inevitably causes deterioration of the combustion in the combustion chambers and sometimes ignition failure. It has been further proposed for the purpose of overcoming the above shortcomings that the charge containing the exhaust gases is ignited by a plurality of spark plugs disposed in combustion chamber wherein the burning time of the charge is shortened since the ignition is achieved with a plurality of ignition sources located in a spaced relationship with respect to each other allowing secure and stable combustion of the charge in the combustion chamber.

However, it is still necessary to further improve the combustion condition in the combustion chambers by shortening the burning time of the charge in the combustion chamber under a condition where a relatively large amount of the exhaust gases recirculated into the combustion chambers of the engine is possible.

It is, therefore, a main object of the present invention to provide an improved spark-ignition internal combustion engine capable of accomplishing stable combustion of the charge in a combustion chamber of the engine resulting in the stable operation of the engine even under conditions wherein a relatively large amount of the exhaust gases are recirculated into the combustion chamber and mixed with the charge inducted into the combustion chamber.

Another object of the present invention is to provide an improved spark-ignition internal combustion engine equipped with a system for performing exhaust gas recirculation, in which a charge containing a relatively large amount of the exhaust gases is effectively burned in a combustion chamber by producing equish turbulence of the charge in the combustion chamber and igniting the charge with a plurality of ignition sources disposed in the combustion chamber.

A further object of the present invention is to provide an improved spark-ignition internal combustion engine equipped with a system for performing exhaust gas recirculation, including a combustion chamber having a squish area to produce the squish turbulence of the charge inducted into the combustion chamber, and a plurality of spark plugs disposed within the combustion chamber.

A still further object of the present invention is to provide an improved spark ignition internal combustion engine which has a combustion chamber in which a hemispherical concavity is formed, concentrically with the cylinder bore, in the cylinder head portion; the diameter of the hemispherical concavity being less than the cylinder bore, so as to provide a squish area between the cylinder head and the crown of the piston at the last stage of the compression stroke.

Other objects and features of the improved spark-ignition internal combustion engine in accordance with the present invention will become more apparent from the following description with the accompanying drawings, in which.

Figure 1:
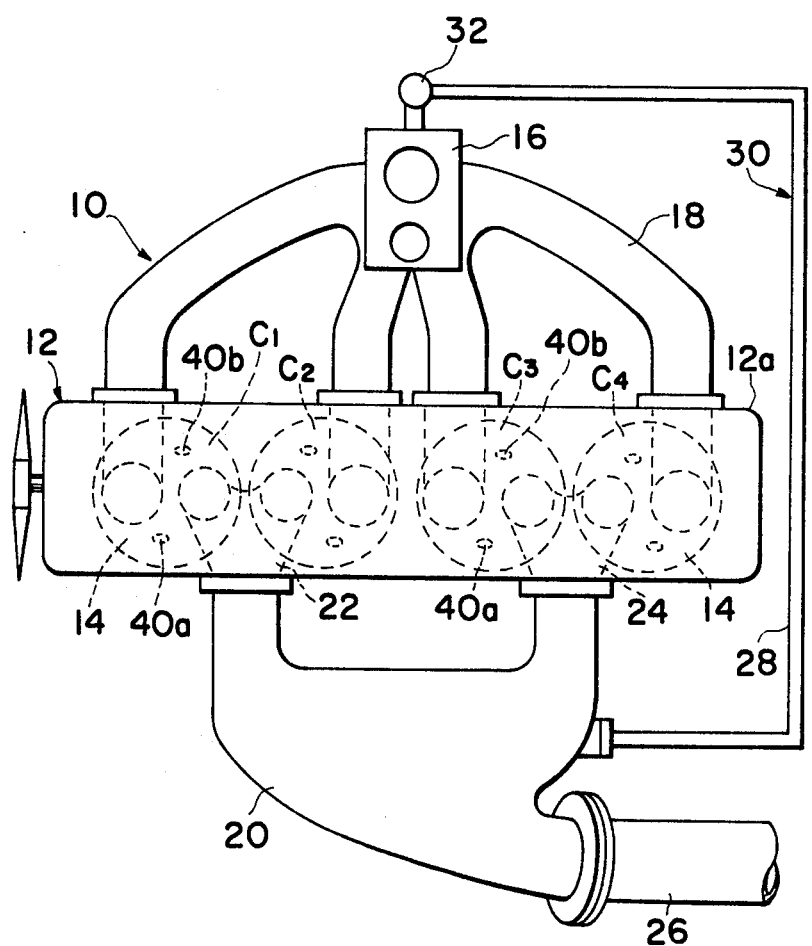
FIG. 1 is a schematic plan view of a preferred embodiment of a spark-ignition internal combustion engine according to the present invention.

Referring now to FIG. 1, there is shown a preferred embodiment of a spark-ignition internal combustion engine in accordance with the principle of the present invention, in which the engine is generally designated by the reference numeral 10. The engine 10 comprises an engine proper 12 of a multi-cylinder type and having, in this instance, four cylinders $C_1$ to $C_4$ as shown in FIG. 1, each of the cylinder conventionally containing therein a combustion chamber 14. The engine 10 is equipped with a carburetor 16 or air-fuel mixture supply means which communicates through an intake manifold 18 or an intake passage with the combustion chambers 14 in the cylinders $C_1$ to $C_4$. The combustion chambers 14 in the cylinders $C_1$ to $C_4$ communicate with a reactor 20 through siamesed exhaust ports 22 and 24 which are formed through the cylinder head 12a of the engine proper 12. The reactor 20 functions to oxidize the unburned constituents, such as carbon monoxide and hydrocarbons, contained in the exhaust gases discharged from the combustion chambers 14. The exhaust gases purified by the reactor 20 are discharged through an exhaust pipe 26 to the atmosphere.

Connected between the reactor 20 and the manifold 18 is a conduit 28 or conduit means forming part of exhaust gas recirculating means 30 or an exhaust gas recirculation system, which functions to recirculate, into the combustion chambers 14, a portion of exhaust gases discharged from the combustion chambers 14 by introducing the portion of exhaust gases into inducted air or intake air passing through the intake manifold 18. A control valve 32 is arranged to control the amount of exhaust gases recirculated, for example, in accordance with the venturi vacuum generated at a venturi portion (not shown) of the carburetor 16 which vacuum is a function of the amount of the intake air. In this instance, the control valve 32 is constructed and set to control the maximum rate of the amount of the exhaust gases recirculated into the combustion chambers with respect to the amount of the intake air, called exhaust gas recirculation rate, in the range from 10 to 50, preferably from 12 to 25% by volume.

Figure 2:
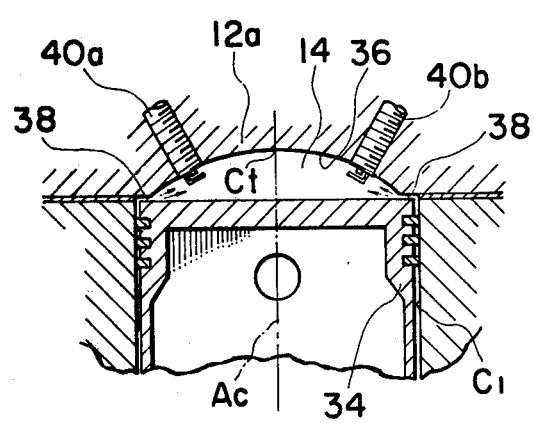
FIG. 2 is a vertical section view showing a combustion chamber arrangement of the engine of FIG. 1.
Figure 3:
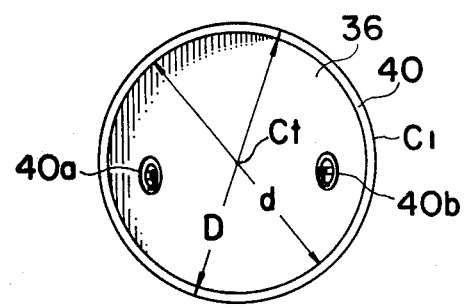
FIG. 3 is a plan view of a cylinder head portion defining the combustion chamber of FIG. 2.

As illustrated in FIG. 2, the combustion chamber 14 is defined by the cylinder head 12a which closes the one end of the cylinder, for example, $C_1$ and the crown of a piston 34 which is reciprocally disposed within the bore of the cylinder $C_1$. The cylinder head 12a has a hemispherical concavity 36 formed concentrically with respect to the cylindrical bore of the cylinder $C_1$. As shown, the concavity 30 forms a major part of the combustion chamber 14. It is to be noted that the diameter $d$ of the hemispherical concavity 36 is smaller than that D of the bore of the cylinder $C_1$ as shown in FIG. 3 and consequently an annular space 38, called a squish area, is formed between the annular flat portion 40 of the cylinder head 12a defining the combustion chamber 14 and the peripheral portion of the crown of the piston 34 which is at the top dead center thereof. With this squish area 38, during the last stage of the compression stroke of the piston 34, most of the air-fuel mixture or the charge supplied into the combustion chamber 14 is squeezed out from the squish area 38 and moved in the directions of the arrows to produce the squish turbulence of the air-fuel mixture within the combustion chamber 14. The squish turbulence promotes smooth and rapid burning of the air-fuel mixture in the combustion chamber 14 and therefore contributes to shortening of the burning time of the same.

It will be understood that as the area of the annular flat portion 40 of the cylinder head adjacent the circular concavity 30 increases, the squish area is increased and accordingly the effect of the squish turbulence is increased. However, since the squish area contacts the inner surface of the cylinder $C_1$ which is cooled by a coolant flowing outside of the cylinder $C_1$ (not shown), the air-fuel mixture residing in the squish area 38 is cooled and does not react readily, which may cause the flame in the combustion chamber 14 to go out and possibly cause misfire of the engine. Therefore, the emission level of unburned hydrocarbons is increased with the increase of the area of the annular flat portion 40 of the cylinder head adjacent the hemispherical concavity 36. As will be appreciated from the foregoing discussion, although the squish turbulence produced by the squish area 38 promotes the smooth and rapid burning of the air-fuel mixture in the combustion chamber 14, it invites increase of the emission level of unburned hydrocarbons. In this connection, the squish area is a quench area where the flame will go out.

In view of the foregoing, the area of the annular flat portion 40 of the cylinder head 12a adjacent the periphery of the concavity 36 should be determined such that the emission level of hydrocarbons is not, to any extent, increased but the squish turbulence is produced. Experiments reveal that it is preferable for obtaining the above described intended purpose that the diameter $d$ of the concavity 36 is in the range from 0.94 to 0.99 times of the diameter D of the bore of the cylinder. The ability of the reactor 20 or other exhaust gas purifying device such as a catalytic converter (not shown) to treat unburned constituents should be considered when determining the squish area, however the area should be as small as possible to prevent any overall increase of the emission level of unburned hydrocarbons.

As illustrated in FIG. 2, two spark plugs 40a and 40b are disposed through the cylinder head 12a and extend into the circular concavity 36, and are located near the periphery of the combustion chamber 14 and spaced oppositely from the center axis Ac of the cylinder. Furthermore, the locations of the two spark plugs are respectively closer to the periphery of the circular concavity 36 than the center $C_t$ of the circular concavity through which the center axis Ac of the cylinder passes. While only two spark plugs are disposed in one combustion chamber in this case as shown in FIG. 2, it will be noted that the number of the spark plugs disposed in one combustion chamber may be increased in accordance with the volume of the combustion chamber and the exhaust gas recirculation rate.

With the arrangement hereinbefore discussed, although the combustion in the combustion chamber is deteriorated by the maximum exhaust gas recirculation rate as high as 12 to 25%, smooth and rapid burning of the charge in the combustion chamber is accomplished and accordingly the burning time of the charge is considerably shortened. This results from the fact that the charge in the one combustion chamber is ignited by a plurality of ignition sources and, additionally, the burning of the charge is promoted by the squish turbulence produced by the squish area. Thus the shortened burning time allows stable combustion of the charge in the engine under such a high exhaust gas recirculation rate. Therefore, the engine according to the present invention can decrease the emission level of nitrogen oxides without the deterioration of stable operation of the engine, and prevent the increase of the emission levels of hydrocarbons and carbon monoxide which have a tendency to increase with the increase of the exhaust gas recirculation rate by the effect of its improved combustion condition in the combustion chamber. The emission levels of hydrocarbons and carbon monoxide are further lowered by the effect of the reactor 20.

While the concavity in the cylinder head is formed such that its diameter is smaller than that of the cylinder for forming the squish area in this case mentioned before, it will be understood that the intended squish may be attained by other known means such as, for example, a specially formed piston crown and/or cylinder head portion defining the combustion chamber. In addition, it will be understood that the present invention can be used with an internal combustion engine equipped with a mechanically or electronically controlled fuel injection system though not shown.

What is claimed is:

1. A spark-ignition internal combustion engine having a cylinder with a bore therein of a specified diameter, comprising:

means defining a combustion chamber capable of producing squish turbulence of the air-fuel mixture supplied from the air-fuel mixture supply means of the engine, the combustion chamber defining means including a cylinder head having a radially disposed flat surface closing the upper end of the cylinder, said cylinder head having a hemispherical concavity formed concentrically with the bore of the cylinder, said hemispherical concavity forming a major part of the combustion chamber and being smaller in diameter at said radially disposed flat surface than that of the cylinder bore thereby defining an annular flat squish area and in which the diameter of said hemispherical concavity is in the range from 0.94 to 0.99 of the diameter of the cylinder bore, and a piston reciprocally disposed within the cylinder and cooperating with said annular flat squish area to produce squish turbulence;

exhaust gas recirculating means for recirculating the exhaust gases of the engine into the combustion chamber in the maximum amount of 10 to 50% by volume of the amount of the intake air which is inducted through the air-fuel mixture supply means into the combustion chamber; and a plurality of spark plugs disposed in the combustion chamber for igniting the air-fuel mixture containing the exhaust gases.

2. A spark-ignition internal combustion engine as claimed in claim 1, in which said exhaust gas recirculating means recirculating the exhaust gases in the maximum amount of 12 to 25% by volume of the amount of the intake air.

3. A spark-ignition internal combustion engine as claimed in claim 2, in which said plurality of spark plugs are two spark plugs, said spark plugs being disposed through the cylinder head and extending into said hemispherical concavity and respectively located closer to the periphery of said hemispherical concavity than the center of said circular concavity.

4. A spark-ignition internal combustion engine as claimed in claim 1, further comprising a reactor communicated downstream of the combustion chamber for oxidizing the unburned constituents contained in the exhaust gases discharged from the combustion chamber.

5. A spark-ignition internal combustion engine as claimed in claim 4, in which the air-fuel mixture supply means includes a carburetor communicated through an intake passage with the combustion chamber.

6. A spark-ignition internal combustion engine as claimed in claim 5, in which said exhaust gas recirculating means includes conduit means connecting said reactor and the intake passage for recirculating the exhaust gases through the intake passage into the combustion chamber, and a control valve disposed in said conduit means for controlling the amount of the exhaust gases passing through said conduit means in said range of the amount of the intake air.

7. A spark-ignition internal combustion engine as claimed in claim 6, in which said control valve is arranged to control the maximum amount of the exhaust gases in said range in response to a venturi vacuum generated at the venturi portion of said carburetor.

* * * * *